March 20, 1956 R. L. PELTON 2,738,986
ROCK REMOVING DEVICE FOR USE WITH DUAL TRUCK WHEELS
Filed March 2, 1953
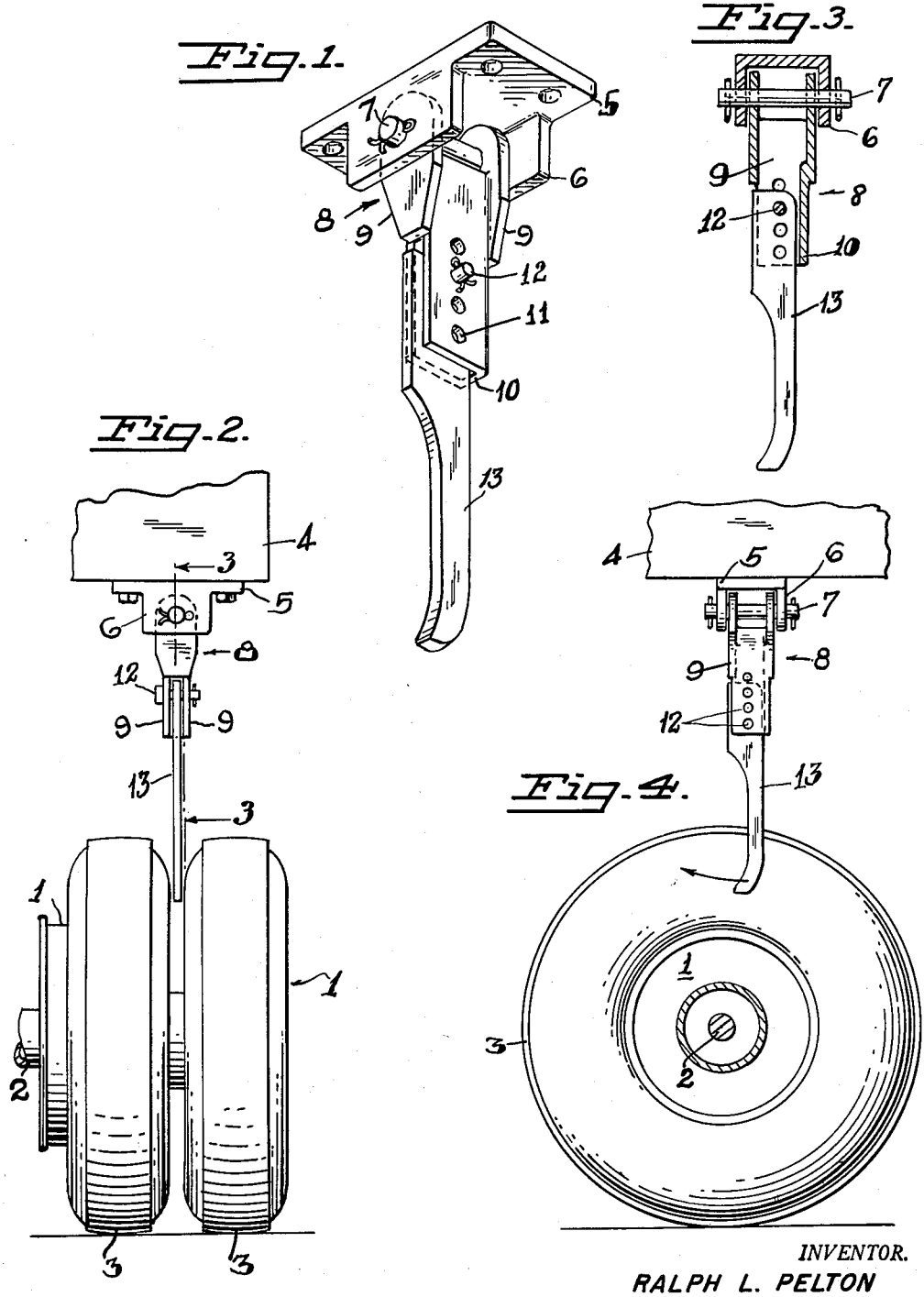
INVENTOR.
RALPH L. PELTON
BY JE Trabucco
ATTORNEY United States Patent Office 2,738,986
Patented Mar. 20, 1956

2,738,986

ROCK REMOVING DEVICE FOR USE WITH DUAL TRUCK WHEELS

Ralph L. Pelton, Petaluma, Calif.

Application March 2, 1953, Serial No. 339,854

5 Claims. (Cl. 280—158)

This invention relates to an improved accessory for use with automobile trucks or other vehicles of the type using dual sets of wheels. More particularly, this invention relates to a device for automatically removing rocks, dirt or other foreign material becoming lodged between the dual wheels of trucks or other vehicles.

Rocks and other foreign materials frequently lodge between the tires carried by dual wheels of trucks and other vehicles, thereby causing such wheels to become unbalanced. It is well known that in the operation of trucks and other vehicles having unbalanced wheels the tires of such wheels wear unevenly and soon must be discarded or retreaded. Since the cost of retreading or replacing large dual truck tires is a substantial item of expense, it is highly desirable that the wheels be maintained in proper balance at all times. Unbalanced vehicle wheels also interfere with the smooth operation of such vehicle, thereby further increasing the costs of operation.

The present invention provides a device adapted to automatically remove rocks and other foreign material which might become lodged between the tires of dual truck wheels as the truck is operated, thereby eliminating at least one common cause frequently contributing to the unbalanced condition of such wheels. The device comprising my invention is adapted to be supported on a truck body or frame in a position whereby its pivoted rock removing element is suspended between the two dual tires carried by a pair of dual wheels. The pivoted rock removing element being positioned to intercept any rock or foreign material which might temporarily become lodged between the dual tires, effectively removes the same as the wheels turn during the forward movement of the truck. The suspended rock removing element is mounted for swinging movement in either sidewise direction and also in a rearward direction, thereby avoiding any damage to the dual truck tires in the event the truck bed is tilted sidewise or when the direction of movement of the truck is reversed.

The primary object of the present invention is to provide a rock removing device for use with trucks or other vehicles having dual sets of wheels, one which is adapted to automatically remove foreign material becoming lodged between the tires of such wheels as the vehicle travels forwardly.

Other and further objects of my invention will be pointed out hereinafter or will be indicated in the claims, or will be obvious to one skilled in the art upon an understanding of the present disclosure. For the purpose of this application I have elected to show herein certain embodiments of a device for removing rocks or other foreign material from between the tires of dual truck wheels representative of my invention; it is to be understood, however, that the embodiment of my invention shown and described herein is for the purpose of illustration only and that therefore it is not to be regarded as exhaustive of the variations of the invention.

In the accompanying drawing:

Fig. 1 is a perspective view of my device for dislodging rocks and other foreign material from between the tires of a pair of dual truck wheels;

Fig. 2 is a rear view showing the device operatively positioned with respect to the dual tires of a truck or other vehicle;

Fig. 3 is a sectional view taken on the line 3—3 of Fig. 2; and

Fig. 4 is a side elevational view of the device, showing the outer vehicle wheel removed.

Referring to the drawing the numerals 1, 1 designate a pair of dual wheels mounted on the rear axle 2 of a truck or other vehicle, the said wheels carrying pneumatic tires 3, 3. Secured to the frame or bed 4 of the truck in an overlying position with respect to the dual wheels 1, 1 is a supporting plate or member 5 having depending spaced flanges 6 thereon. Pivotally secured to the flanges 6 as by a pin 7 which is positioned substantially at right angles with respect to the axle 2 is a laterally swinging link member 8 having spaced opposed lateral sides 9 and a forwardly disposed side 10. The opposed lateral sides 9 of the link member are provided with vertically spaced pairs of holes 11, the holes of each pair being in the same horizontal plane. Supported in one pair of such holes is a pivot pin 12 which is in substantially parallel relationship with respect to the axle 2 of the vehicle. Pivotally supported between the lateral sides 9 of the link member 8 on the pin 12 is a depending rock displacing bar 13 having its lower end portion extending between the tires 3, 3. The bar 13 is free to swing rearwardly in the direction of the arrow in Fig. 4, but any substantial forward movement thereof is prevented by the forward side 10 of the link member 8. The rear side of the bar 13 preferably has a concave curvature, or it may have a rearwardly curved or bent end portion, thereby making it possible to deflect or discharge any rocks or foreign material lodged between the tires in an upward direction as the wheels 1, 1 rotate in a clockwise direction when the vehicle travels forwardly. In order to make it possible for my rock removing device to be adapted for use with trucks or vehicles of different types, the bar 13 is mounted for vertical adjustment, such vertical adjustment being accomplished by positioning the pivot pin 12 in different pairs of holes 11. It is desirable for best results to have the rock intercepting portion of the bar 13 positioned so it extends between the tires 3, 3 to a point where the adjacent sides of the tires are closest together.

The bar 13 is free to swing rearwardly as indicated by the arrow in Fig. 4, and in the event a rock is lodged between the tires 3, 3 as the vehicle moves rearwardly, the bar when intercepted by such rock will turn about its pivot to allow the rock to pass by without damaging the rock removing device or any part of the vehicle.

In the event the bed or frame 4 of the truck tilts sidewise with respect to the axle 2 the rock displacing bar 13 will remain in a substantially vertical position without exerting any damaging pressure on the tires 3, 3, this being due to the pivotal mounting of the link member 8 on the pin 7.

What I claim is:

1. In a rock removing device for use with dual vehicle wheels having dual pneumatic tires, a supporting member mounted on the vehicle, a depending bar extending vertically between the dual tires, the said bar being pivotally mounted on the supporting member for rearward swinging movement and means mounted on the supporting member and arranged forwardly of a vertical plane passing longitudinally through the bar for preventing the bar from swinging forwardly beyond its vertical position.

2. In a rock removing device for use with dual vehicle wheels having dual tires, a supporting member mounted on the vehicle, a depending link member mounted for sidewise pivotal movement on the supporting member, and a depending bar mounted on the link member and extending between the dual tires.

3. In a rock removing device for use with dual vehicle wheels having dual pneumatic tires, a supporting member mounted on the vehicle, a depending link member mounted for sidewise pivotal movement on the supporting member, and a depending bar mounted for rearward pivotal movement on the link member and extending between the tires, and means carried by the link member for limiting the forward pivotal movement of the bar.

4. In a rock removing device for use with dual vehicle wheels having dual pneumatic tires, a supporting member pivotally mounted for sidewise swinging movement on the vehicle and having spaced depending flanges, a pin supported on the flanges, a depending link member mounted on the pin, and a depending bar mounted for rearward swinging movement on the link member, the said bar extending between the tires, and means carried by the link for limiting the forward swinging movement of the bar.

5. In a rock-removing device for use with dual vehicle wheels of the type having dual pneumatic tires, a supporting structure mounted on a vehicle, a connecting link member mounted on the supporting structure and arranged for pivotal movement about a substantially horizontal pivot and a depending bar mounted on the link member, said bar extending between the dual tires and arranged for pivotal movement about a second horizontal pivot, the first mentioned and second horizontal pivots being at substantially right angles to each other.

References Cited in the file of this patent

UNITED STATES PATENTS

| | | |
|---|---|---|
| 2,189,253 | Schuman | Feb. 6, 1940 |
| 2,356,292 | Wildman | Aug. 22, 1944 |

FOREIGN PATENTS

| | | |
|---|---|---|
| 546,017 | France | Aug. 7, 1922 |
| 572,893 | France | Feb. 29, 1924 |
| 156,072 | Great Britain | July 7, 1921 |